(12) United States Patent
Sadri et al.

(10) Patent No.: US 10,953,940 B1
(45) Date of Patent: Mar. 23, 2021

(54) METHOD AND SYSTEM FOR ADJUSTING A PANEL ON A VEHICLE

(71) Applicant: Ford Global Technologies, LLC, Dearborn, MI (US)

(72) Inventors: Hossein Jacob Sadri, Novi, MI (US); Steve Juszczyk, Walled Lake, MI (US); John Emmott Olson, Dexter, MI (US); Lance David Marsac, South Lyon, MI (US); Andrew Louis Pawlak, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 16/585,470

(22) Filed: Sep. 27, 2019

(51) Int. Cl.
  *B62D 65/06* (2006.01)
  *B62D 65/02* (2006.01)

(52) U.S. Cl.
  CPC .......... *B62D 65/06* (2013.01); *B62D 65/026* (2013.01)

(58) Field of Classification Search
  CPC .... B62D 65/06; B62D 65/026; B62D 65/028; B25J 9/1697; B23P 19/047; G05B 19/402; G05B 19/41805
  See application file for complete search history.

(56) References Cited

U.S. PATENT DOCUMENTS

| | | | |
|---|---|---|---|
| 4,627,158 A | 12/1986 | Mitoh | |
| 5,380,978 A | 1/1995 | Pryor | |
| 8,096,044 B2 | 1/2012 | Roach et al. | |
| 9,422,016 B2 | 8/2016 | Mangiarino | |
| 2004/0158965 A1* | 8/2004 | Savoy | B62D 65/06 29/407.1 |
| 2018/0178867 A1* | 6/2018 | Sadri | B62D 65/028 |
| 2019/0003126 A1 | 1/2019 | Lepo et al. | |

* cited by examiner

*Primary Examiner* — Jun S Yoo
(74) *Attorney, Agent, or Firm* — Burris Law, PLLC

(57) ABSTRACT

A method of adjusting a panel on a vehicle includes determining positions of mounting sites on a body frame in relation to 2-way and 4-way master locator holes and calculating a position of an inner perimeter of a panel opening in the body frame in relation to the body frame mounting sites. Positions of mounting sites on the panel in relation to 2-way and 4-way locator pins on a fixture the panel is mounted to are also determined and a position of an outer perimeter of the panel in relation to the panel mounting sites is calculated. The panel is mounted to the body frame and a calculated position of the outer perimeter of the panel in relation to the inner perimeter of the panel opening is displayed to a fitter in real time who uses the calculated position to adjust the panel.

20 Claims, 7 Drawing Sheets

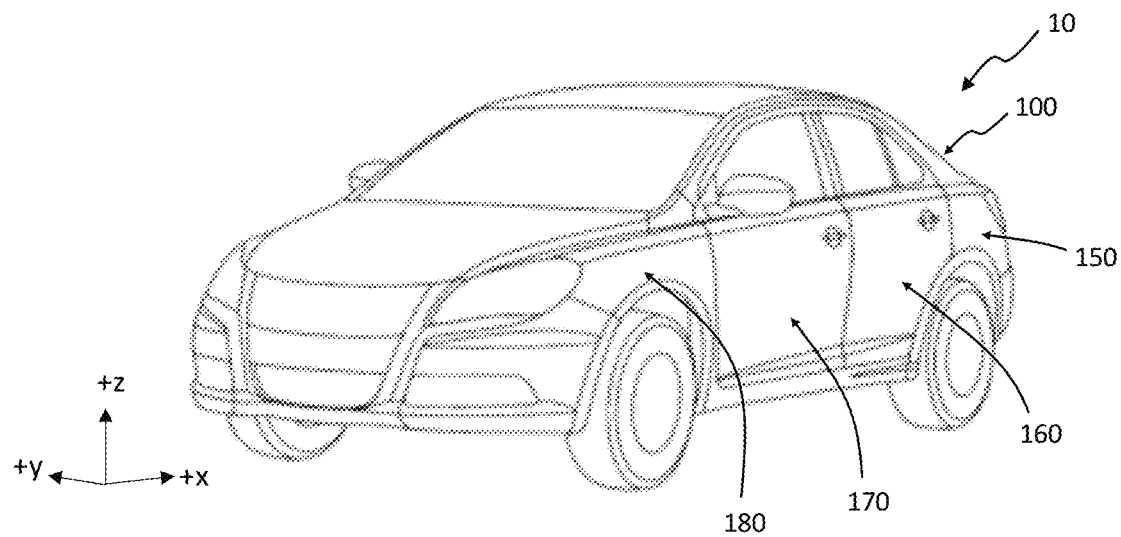
FIG. 1
*PRIOR ART*
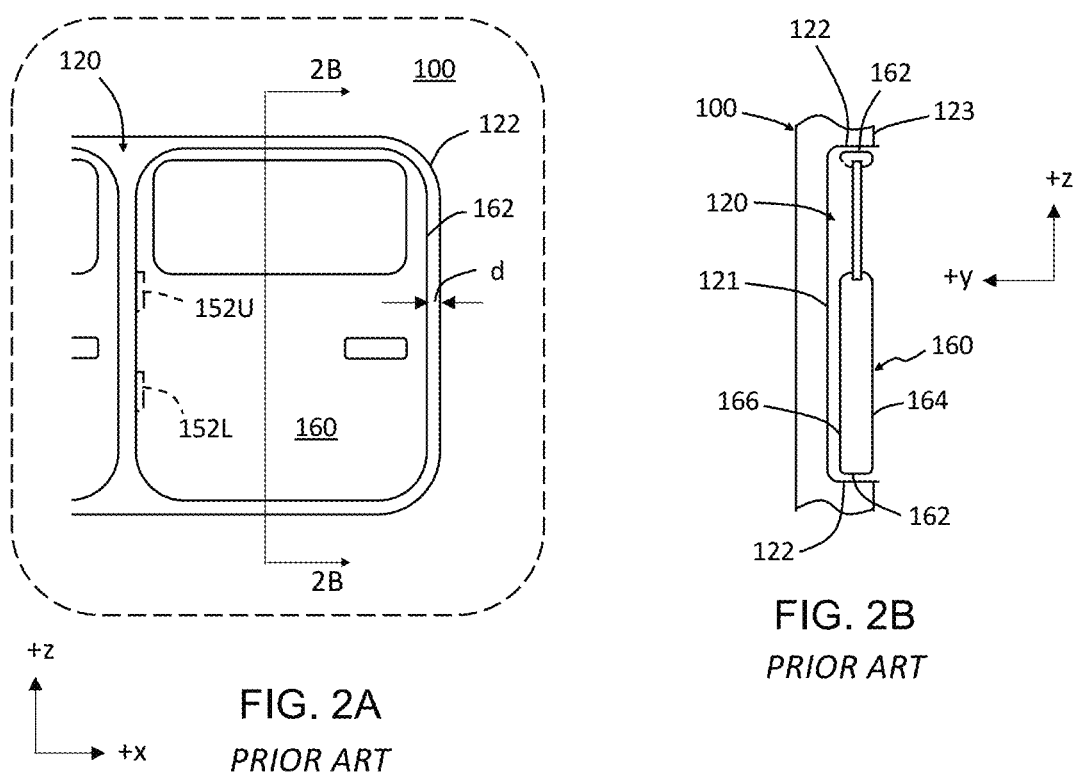
FIG. 2A
*PRIOR ART*
FIG. 2B
*PRIOR ART*

METHOD AND SYSTEM FOR ADJUSTING A PANEL ON A VEHICLE

FIELD

The present disclosure relates to assembly of vehicles and particularly to assembly of panels on vehicles.

BACKGROUND

The statements in this section merely provide background information related to the present disclosure and may not constitute prior art.

The manufacture of a vehicle on an assembly line includes mounting various panels onto the body frame. Such panels include rear quarter panels, a trunk lid, rear and/or front doors, front quarter panels, and a hood, among others. Mounting, i.e., positioning and connecting, the panels to the body frame involves alignment of the panels within or in relation to panel openings in the body frame such that an exterior surface of the assembled vehicle meets engineering and design specifications. For some panels, e.g., front and/or rear vehicles doors, a "fitter" on the assembly can make a corrective positioning adjustment such that a final position of the panels meets the engineering and design specifications.

The present disclosure addresses issues related to adjusting panels mounted to a vehicle body frame along with other issues related to the manufacture of vehicles.

SUMMARY

In one form of the present disclosure, a method of adjusting a panel on a vehicle includes determining positions of mounting sites on a body frame in relation to 2-way and 4-way master locator holes and calculating a position of an inner perimeter of a panel opening in the body frame in relation to the body frame mounting sites. Positions of mounting sites on a panel in relation to 2-way and 4-way locator pins on a fixture the panel is mounted to is also determined and a position of an outer perimeter of the panel in relation to the panel mounting sites is calculated. The method includes mounting the panel to the body frame and calculating a position of the outer perimeter of the panel in relation to the inner perimeter of the panel opening, displaying the position of the outer perimeter of the panel in relation to the inner perimeter of the panel opening, and adjusting the position of the panel as a function of the displayed position.

In some variations of the present disclosure the panel is mounted to the body frame with mounting devices. In such variations, the mounting sites on the body frame comprise hinge holes in the body frame, the mounting sites on the panel comprise hinge holes in the panel, and the mounting devices comprise hinges.

In at least one variation, calculating the position of the inner perimeter of the panel opening in the body frame in relation to the body frame mounting sites and calculating the outer perimeter of the panel in relation to the panel mounting sites includes using computer aided design (CAD) data of the body frame and the panel. In one variation the panel is a vehicle door and the CAD data of the panel is CAD data of the vehicle door. In one such variation the vehicle door is a rear door, the hinge holes in the body frame are rear door hinge holes in the body frame, the hinge holes in the panel are hinge holes in the rear door, and the hinges are rear door hinges. The method can further include determining positions of front door hinge holes in the body frame in relation to the 2-way and 4-way master locator holes and calculating a position of an inner perimeter of a front door panel opening in relation to the front door hinge holes in the body frame using CAD data of the body frame. Also, the positions of hinge holes in a front door in relation to 2-way and 4-way locator pins on another fixture the front door is mounted to are determined and a position of an outer perimeter of the front door in relation to the hinge holes in the front door is calculated using CAD data of the front door. In at least one variation, the method includes connecting front door hinges to the front door hinge holes in the body frame and to the hinge holes in the front door such that the front door is mounted to the body frame at the front door opening panel, and calculating positions of the front door hinges and outer perimeter of the front door in relation to the inner perimeter of the front door panel opening using the CAD data of the body frame and the CAD data for the front door. The position(s) of the outer perimeter of the front door in relation to the inner perimeter of the front door panel opening is displayed to a fitter on an assembly line and the position of the front door in relation to the front door panel opening is adjusted as a function of the displayed positions to the fitter.

In at least one variation, the function of the displayed position is a desired distance the mounting devices (e.g., the hinges) should be moved along at least one of a length direction, a height direction and a width direction of the vehicle. In at least one other variation, the function of the displayed position is a difference between the calculated position of the outer perimeter of the panel with respect to the calculated inner perimeter of the panel opening and a desired position of the outer perimeter of the panel with respect to the calculated inner perimeter of the panel opening.

In some variations the method includes determining the positions of the mounting sites, the 2-way master locator hole and the 4-way master locator hole with at least one optical sensor and/or determining the positions of the mounting sites on the panel with at least one optical sensor.

In another form of the present disclosure, a method of adjusting a panel on a vehicle during manufacture of the vehicle includes assembling a body frame of the vehicle on an assembly line. The method includes determining positions of hinge holes in the body frame in relation to 2-way and 4-way master locator holes and calculating a position of an inner perimeter of a panel opening in relation to the hinge holes in the body frame using CAD data of the body frame. The method also includes determining positions of hinge holes in the panel in relation to 2-way and 4-way locator pins on a fixture the panel is mounted to and calculating a position of an outer perimeter of the panel in relation to the hinge holes in the panel using CAD data of the panel. In some variations hinges are connected to the body frame and the panel via the hinge holes in the body frame and the hinge holes in the panel, respectively. Also, the positions of the hinges and an outer perimeter of the panel in relation to the inner perimeter of the panel opening is calculated and the positions of the hinges in relation to the positions of the outer perimeter of the panel and the inner perimeter of the panel opening are displayed to a fitter on the assembly line. In some variations of the present disclosure the fitter adjusts the position of the panel as a function of the displayed positions of the hinges. For example, in one variation the fitter adjusts the position of at least one hinge as a function of the displayed positions of the hinges and thereby adjusts the position of the panel in relation to the panel opening. In such a variation the function of the displayed positions of the hinges can be a desired distance to move the at least one hinge along at least one of a length direction, a height direction and a width direction of the vehicle frame.

In some variations the panel is a rear door and the panel opening is a rear door panel opening. In one such variation, the function of the displayed positions of the hinges is a difference between the calculated position of the outer perimeter of the rear door with respect to the calculated inner perimeter of the rear door panel opening and a desired position of the outer perimeter of the rear door with respect to the calculated inner perimeter of the rear door panel opening.

In other variations the method includes determining the locations of at least one of the body frame hinge holes, the 2-way master locator hole, the 4-way master locator hole, the 2-way locator pin, the 4-way locator pin, and the rear door hinge holes using at least one optical sensor.

In at least one variation of the present disclosure, the method further includes determining positions of front door hinge holes in the body frame in relation to the 2-way and 4-way master locator holes and calculating a position of an inner perimeter of a front door panel opening in relation to the front door hinge holes in the body frame using CAD data of the body frame. In such a variation the method includes determining positions of hinge holes in a front door in relation to 2-way and 4-way locator pins on another fixture the front door is mounted to and calculating a position of an outer perimeter of the front door in relation to the front door hinge holes using CAD data of the front door. The front door hinges are connected to the front door hinge holes in the body frame and to the hinge holes in the front door such that the front door is mounted to the body frame at the front door opening panel. The positions of the outer perimeter of the front door in relation to the inner perimeter of the front door panel opening is calculated using the CAD data of the body frame and the CAD data of the front door. Positions of the outer perimeter of the front door in relation to the inner perimeter of the front door panel opening are displayed to a fitter on the assembly line and the fitter adjusts the position of the front door as a function of the displayed positions. In some variations the calculated position of the inner perimeter of the front door panel opening includes the position of the outer perimeter of the rear door in relation to the inner perimeter of the rear door panel opening.

In still another form of the present disclosure, a method for mounting and adjusting a door on a vehicle during manufacture of the vehicle on an assembly line includes determining positions of rear door hinge holes in a body frame in relation to a 2-way master locator hole and a 4-way master locator hole using at least one optical sensor and calculating a position of an inner perimeter of a rear door panel opening in relation to the rear door hinge holes in the body frame using CAD data of the body frame. In at least one variation the method includes determining positions of hinge holes in a rear door in relation to a 2-way locator pin and a 4-way locator pin on a fixture the rear door is mounted to using at least one other optical sensor and calculating a position of an outer perimeter of the rear door in relation to the hinge holes in the rear door using CAD data of the rear door. Rear door hinges are connected to the body frame and the rear door via the rear door hinge holes in the body frame and the hinge holes in the rear door, and positions of the rear door hinges and an outer perimeter of the rear door in relation to the inner perimeter of the rear door panel opening are calculated using CAD data of the rear door hinges and the CAD data for the body frame and the rear door. The positions of the hinges in relation to the positions of the outer perimeter of the panel and the inner perimeter of the rear door panel opening are displayed to a fitter on the assembly and the fitter adjusts the position of at least one of the rear door hinges as a function of the displayed positions of the hinges. In at least one variation the calculated positions of the rear door hinges, the outer perimeter of the rear door and the inner perimeter of the rear door panel opening are within manufacturing tolerances of the actual positions of the rear door hinges, the outer perimeter of the rear door and the inner perimeter of the rear door panel opening.

In some variations of the present disclosure, the method also includes determining positions of front door hinge holes in the body frame in relation to the 2-way and 4-way master locator holes and calculating a position of an inner perimeter of a front door opening in relation to the front door hinge holes in the body frame using CAD data of the body frame. Positions of hinge holes in a front door in relation to 2-way and 4-way locator pins on another fixture the front door is mounted to are determined and a position of an outer perimeter of the front door in relation to the hinge holes in the front door is calculated using CAD data of the front door. Front door hinges are connected to the front door hinge holes in the body frame and to the hinge holes in the front door such that the front door is mounted to the body frame at the front door opening panel. In at least one variation the positions of the outer perimeter of the front door in relation to the inner perimeter of the front door panel opening is calculated using the CAD data of the body frame and the CAD data of the front door and the positions of the outer perimeter of the front door in relation to the inner perimeter of the front door panel opening are displayed to a fitter on the assembly line. Also, the fitter adjusts the position of the front door as a function of the displayed positions.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a perspective view of a vehicle according to the prior art;

FIG. 2A is a side view of a vehicle panel mounted within a panel opening of a vehicle body frame according to the prior art;

FIG. 2B is a cross sectional view of section 2B-2B in FIG. 2A according to the prior art;

Figure 3:
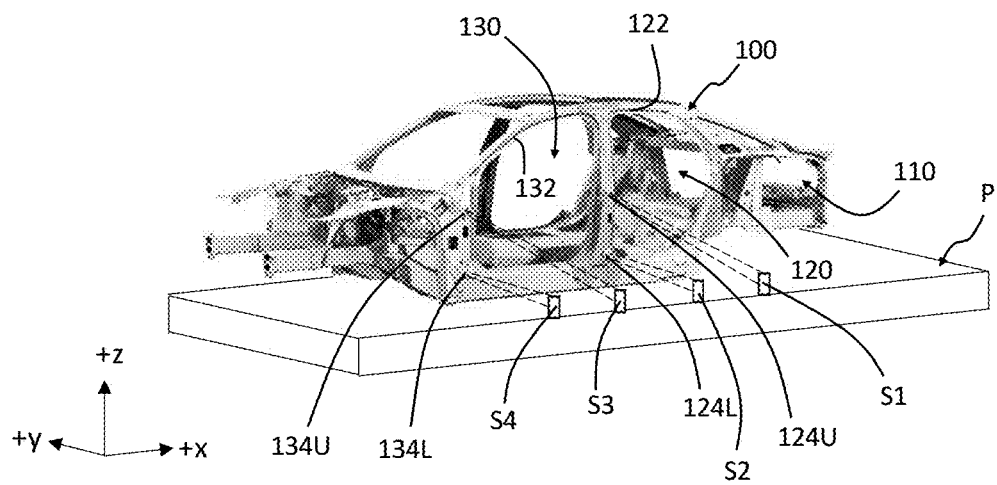
FIG. 3 shows one step of a method of mounting and adjusting a vehicle panel on a vehicle according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring now to FIG. 1, a vehicle 10 with a plurality of panels mounted to a body frame 100 (shown in more detail in FIGS. 3 and 4) is shown. The vehicle 10 includes panels such as a rear quarter panel 150, a rear door 160, a front door 170, and a front quarter panel 180 (referred to herein collectively as "panels 150-180") mounted to the body frame 100. While FIG. 1 only shows panels 150-180 on one side (e.g., the left side) of the vehicle 10, it should be understood that similar and symmetric panels are mounted on another side (e.g., the right side) of the body frame 100 and the methods disclosed herein are used to adjust such panels. It should also be understood that the methods disclosed herein can be used to mount other panels on a vehicle. Non-limiting examples of such other panels include trunk lids, hoods, and sunroofs, among others.

Referring now to FIGS. 2A and 2B, a panel in the form of the rear door 160 is shown mounted and positioned within a rear door panel opening 120 an upper hinge 152U and a lower hinge 152L. In some variations of the present disclosure, the rear door panel opening 120, and other panel openings disclosed herein, include an inner perimeter (e.g., inner perimeter 122), an inner wall (e.g., inner wall 121) and/or an outer wall (e.g., outer wall 123). Also, the rear door 160, and other panels disclosed herein, include an outer perimeter (e.g., outer perimeter 162), an outer wall (e.g., outer wall 164) and an inner wall (e.g., inner wall 166). The "as-mounted" position of the rear door 160 in relation to the rear door panel opening 120 provides a desired seal between the rear door 160 and the body frame 100, and a desired space between the inner perimeter 122 and the outer perimeter 162. That is, a distance 'd' and alignment between the inner perimeter 122 and the outer perimeter 162 along the length of each perimeter is generally uniform and within one or more engineering specifications. And in some variations of the present disclosure, the position of an outer and/or inner wall of a panel is aligned with an outer and/or inner wall of a body frame and/or other panel. For example, the outer wall 164 of the rear door 160 is aligned with an outer surface 123 of the door panel opening along a width direction (y direction) of the vehicle 10 as shown in FIG. 2B.

The position or location of the outer perimeter 162 of the rear door 160 relative to the inner perimeter 122 of the rear door panel opening 120 is affected by such factors as the shape of the body frame 100 after it has been assembled (e.g., in a framing station of an assembly line), the shape of the rear door 160 after it has been assembled (e.g., in a door assembly station), and the shape of hinges (not shown) used to mount the rear door 160 to the body frame 100, among others. Also, it should be understood that the body frame 100, the panels 150-180, and other panels and components of the vehicle, are modeled and represented by modeling data such as computer aided design (CAD) modeling data (referred to herein simply as "CAD data"). That is, most if not all components of a vehicle is generally designed and modeled using CAD and representations of the components of the components, e.g., CAD data of the components, is stored in and accessible from electronic memory. For example, CAD data for the shape and dimensions of the body frame 100 including the inner perimeter 122 of the rear door panel opening 120, and CAD data for the shape and dimensions of the rear door 160 including the outer perimeter 162, is stored in and accessible from electronic memory. Also, the actual shape and dimensions of the body frame 100 and the panels 150-180 is the same as its corresponding CAD data within manufacturing tolerances. As used herein, the phrase "manufacturing tolerance" or "manufacturing tolerances" refers to a permissible limit or limits of variation in a physical dimension or measured value of a manufactured object (e.g., a body frame and/or a panel) such that the variation does not significantly affect the functioning of the object.

Referring now to FIG. 3, a step for a method of mounting a panel on the body frame 100 is shown. Particularly, the body frame 100 has a plurality of panel openings such as a rear quarter panel opening 110, the rear door panel opening 120, and a front door panel opening 130, among others, and is supported on a platform 'P' as it moves along the assembly line. It should be understood that the body frame 100 has been assembled from a plurality of body frame components such as, but not limited to, an A-pillar component (not labeled) and a B-pillar component. After the body frame 100 has been assembled on the assembly line as shown in FIG. 3, positions of mounting sites on the body frame 100 are determined with respect to a reference point, line and/or plane. In some variations of the present disclosure, the positions of mounting sites on the body frame 100 are determined with respect to a reference point, line and/or plane on the platform 'P'. In one non-limiting example, the positions of upper hinge holes 124U and lower hinge holes 124L (i.e., mounting sites) for mounting the rear door 160 to the body frame 100 are determined, as are the positions of upper hinge holes 134U and lower hinge holes 134L for mounting the front door 170 to the body frame 100. In at least some variations of the present disclosure, the positions of the upper hinge holes 124U, the lower hinge holes 124L, the upper hinge holes 134U, and the lower hinge holes 134L in the body frame 100 are determined with at least one optical sensor 'S'. For example, and as shown in FIG. 3, the position(s) of the upper hinge holes 124U are determined (i.e., detected or measured) with an optical sensor 'S1', the position(s) of the lower hinge holes 124L are determined with an optical sensor 'S2', the position(s) of the upper hinge holes 134U are determined with an optical sensor 'S3', and the position(s) of the lower hinge holes 134L are determined with an optical sensor 'S4'. However, it should be understood that the positions of the hinge holes 124U, 124L, 134U, 134L can be determined with one optical sensor, two optical sensors, three optical sensors, or four or more optical sensors. Also, and as discussed in greater detail below, the positions of the hinge holes 124U, 124L, 134U, 134L can be stored in electronic memory and/or transmitted in real time to a door fitting station located downstream on the assembly line.

Figure 4:
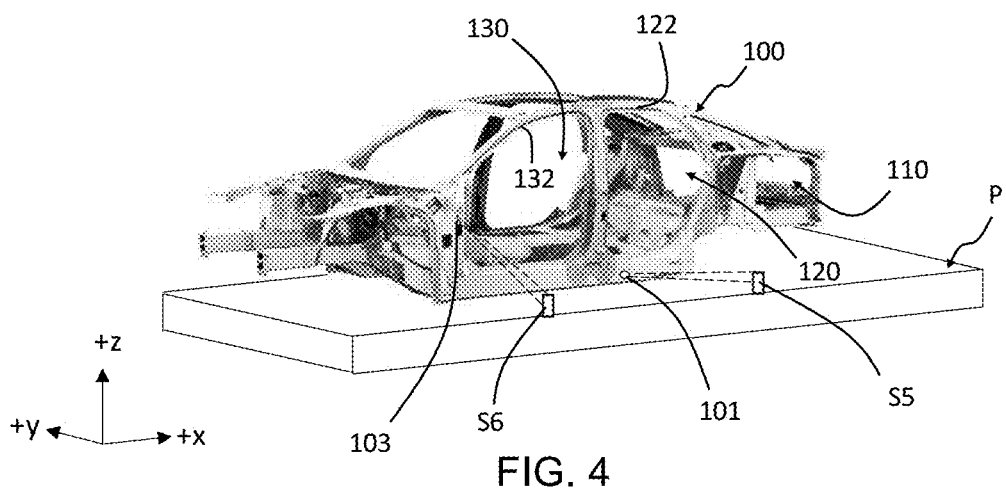
FIG. 4 shows another step of a method of mounting and adjusting a vehicle panel on a vehicle according to the teachings of the present disclosure.

Referring now to FIG. 4, another step for a method of mounting a panel on the body frame 100 is shown. Particularly, positions of reference sites of the vehicle 10 are determined. As used herein, the phrase "reference site" or "reference sites" refers to a position or positions on or in the vehicle from which the location or position of panels, components, holes, edges, and surfaces of the vehicle, among others can be determined or measured from. Stated differently, the location or position of panels, components, holes, edges, and surfaces of the vehicle can be measured in relation to a reference site or reference sites. It should be understood that the positions of the reference sites are determined with respect to a reference point, line and/or plane and their location depends on the tooling and product architecture of the vehicle 10. In some variations of the present disclosure, the positions of the reference sites are determined with respect to the same reference point, line and/or plane used to determine the locations of the mounting sites described above. In one non-limiting example, the references sites include a 2-way master locator hole 101 and a 4-way master locator hole 103. While the 2-way master locator hole 101 and the 4-way master locator hole 103 shown in FIG. 4 are in the body frame 100, it should be understood that the location of a 2-way master locator hole 101 and a 4-way master locator hole 103 can be located in or on other areas of the vehicle 10 depending on the tooling and product architecture of the vehicle 10. For example, the 2-way master locator hole 101 and a 4-way master locator hole 103 can be located on or in an underbody of the vehicle 10. In some variations of the present disclosure, the position of the 2-way master locator hole 101 is determined with an optical sensor 'S5' and the position of the 4-way master locator hole 103 is determined with an optical sensor 'S6'. However, it should be understood that the positions of the 2-way master locator hole 101 and the 4-way master locator hole 103 can be determined with one optical sensor or two or more optical sensors. Also, and as discussed in greater detail below, the positions of the 2-way master locator hole 101 and the 4-way master locator hole 103 can be stored in electronic memory and/or transmitted in real time to the door fitting station located downstream on the assembly line.

In some variations of the present disclosure the positions of the hinge holes 124U, 124L, 134U, 134L and the positions of the master locator holes 101, 103 are used to calculate the position of the inner perimeter 122 of the rear door panel opening 120 relative to the hinge holes 124U, 124L, 134U, 134L within manufacturing tolerances. For example, and after determining the location of the 2-way master locator hole 101 and the 4-way master locator hole 103 as shown in FIG. 4, the positions of various physical objects or features of the body frame 100 such as holes, edges, and perimeters, among others, are calculated in relation to the 2-way master locator hole 101 and the 4-way master locator hole 103, within manufacturing tolerances, using CAD data for the body frame 100. Stated differently, once the position of the 2-way master locator hole 101 and the 4-way master locator hole 103 are determined, e.g., after the body frame 100 has been assembled, the CAD data for the body frame 100 is used to determine the positions of holes, edges, and perimeters of the body frame 100 relative to the 2-way master locator hole 101 and the 4-way master locator hole 103. Furthermore, and given that the positions of the hinge holes 124U, 124L, 134U, 134L are determined with reference to the 2-way master locator hole 101 and the 4-way master locator hole 103, the CAD data for the body frame 100 is used to determine the positions of holes, edges, and perimeters of the body frame 100 relative to the hinge holes 124U, 124L, 134U, 134L, within manufacturing tolerances. Accordingly, the position or positions of the inner perimeter 122 of the rear door panel opening 120 is calculated in relation to the hinge holes 124U, 124L within manufacturing tolerances and stored in electronic memory and/or transmitted in real time to the door fitting station located downstream on the assembly line.

Figure 5:
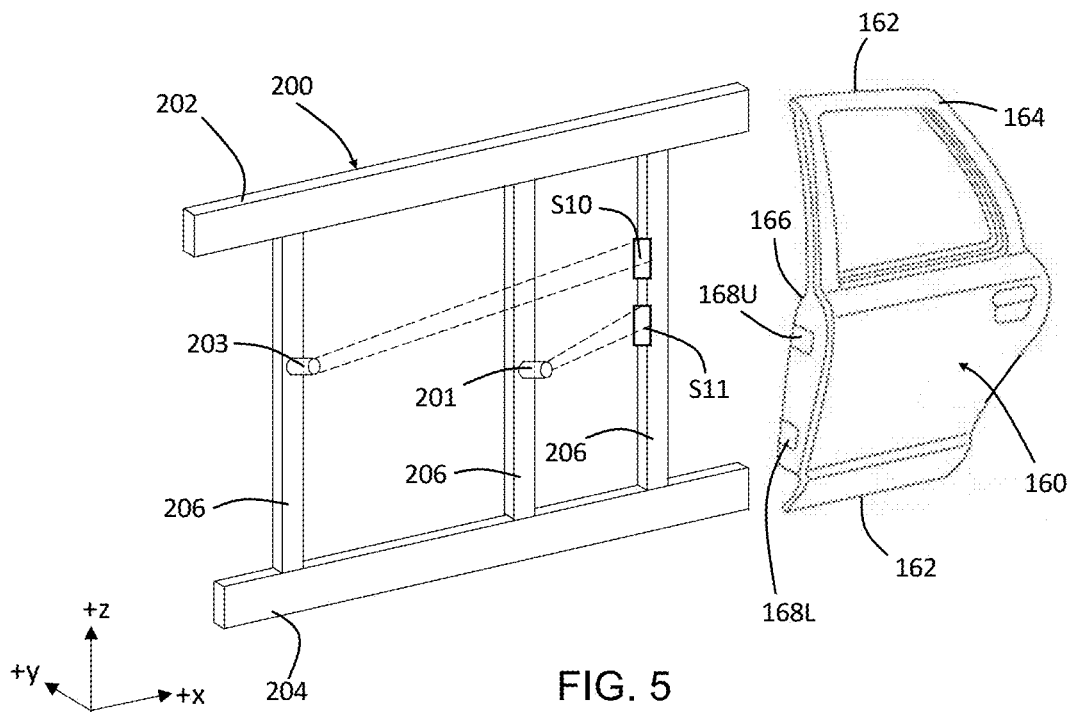
FIG. 5 shows still another step of a method of mounting and adjusting a vehicle panel on a vehicle according to the teachings of the present disclosure.

Referring now to FIG. 5, still another step for a method of mounting a panel on the body frame 100 is shown. Particularly, positions of reference sites on a panel fixture 200 are determined. One non-limiting example of the panel fixture 200 is shown in FIG. 5 and includes a top rail 202, a bottom rail 204, and a plurality of braces 206 extending between and connected to the top rail 202 and bottom rail 204. It should be understood that the positions of the reference sites are determined with respect to a reference point, line and/or plane, e.g., a reference point, line and/or plane on the panel fixture 200.

In one non-limiting example, the reference sites on the panel fixture 200 include a 2-way locator pin 201 and a 4-way locator pin 203 and the position of the 2-way locator pin 201 is determined with an optical sensor 'S10' and the position of the 4-way locator pin is determined with an optical sensor 'S11'. However, it should be understood that the positions of the 2-way locator pin 201 and the 4-way locator pin 203 can be determined with one optical sensor or two or more optical sensors.

Figure 6:
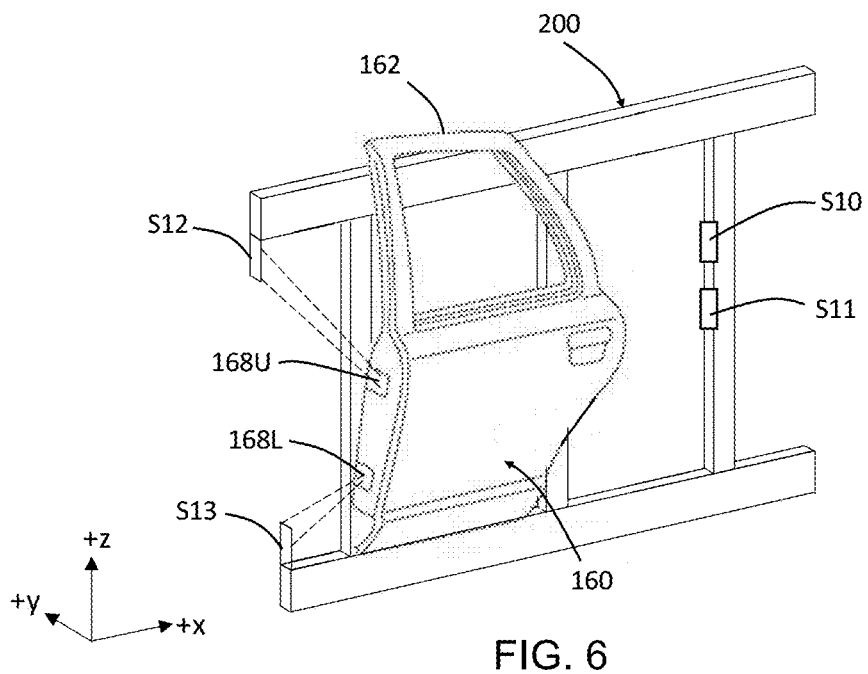
FIG. 6 shows yet another step of a method of mounting and adjusting a vehicle panel on a vehicle according to the teachings of the present disclosure.

Referring now to FIG. 6, still yet another step for a method of mounting a panel on the body frame 100 is shown. Particularly, the rear door 160 is mounted or positioned on the 2-way locator pin 201 and the 4-way locator pin 203 and positions of mounting sites on the rear door 160 are determined. It should be understood that the positions of the mounting sites are determined with respect to a reference point, line and/or plane, e.g., a reference point, line and/or plane on the panel fixture 200. In one non-limiting example, the mounting sites include upper hinge holes 168U and lower hinge holes 168L for mounting the rear door 160 to the body frame 100 are determined. In at least some variations of the present disclosure, the positions of the upper hinge holes 168U and the lower hinge holes 168L are determined with at least one optical sensor 'S'. For example, and as shown in FIG. 6, the position(s) of the upper hinge holes 168U are determined with an optical sensor 'S12' and the position(s) of the lower hinge holes 168L are determined with an optical sensor 'S13'. However, it should be understood that the positions of the hinge holes 168U and 168L can be determined with one optical sensor or two or more optical sensors.

In some variations of the present disclosure the positions of the hinge holes 168U, 168L and the positions of the locator pins 201, 203 are used to calculate the position or positions of the outer perimeter 162 of the rear door 160 relative to the hinge holes 168U, 168L within manufacturing tolerances. For example, determining the location of the 2-way locator pin 201 and the 4-way locator pin 203 as shown in FIG. 5, and mounting the rear door 160 on the locator pins 201, 203 and determining the positions of the hinge holes 168U, 168L as shown in FIG. 6, allows the positions of various physical objects or features of the rear door 160 such as holes, edges, and perimeters, among others, to be calculated in relation to the hinge holes 168U, 168L using the CAD data for the rear door 160. Stated differently, once the position of a corresponding 2-way locator hole (not shown) in the rear door 160 that is disposed on the 2-way locator pin 201 and the position of a corresponding 4-way locator hole (not shown) in the rear door 160 that is disposed on the 4-way locator pin 203 are determined, the CAD data for the rear door 160 is used to determine the positions of holes, edges, and perimeters of the rear door 160 relative to the 2-way locator hole and the 4-way locator hole. Furthermore, and given that the positions of the hinge holes 168U, 168L are determined with reference to the 2-way locator pin 201 (and corresponding 2-way locator hole) and the 4-way locator pin 203 (and corresponding 4-way locator hole), the CAD data for the rear door 160 is used to determine the positions of holes, edges, and perimeters of the rear door 160 relative to the hinge holes 168U, 168L within manufacturing tolerances. Accordingly, the position or positions of the outer perimeter 162 of the rear door 160 is calculated in relation to the hinge holes 168U, 168L within manufacturing tolerances and stored in electronic memory and/or transmitted in real time to the door fitting station located downstream on the assembly line.

Figure 7:
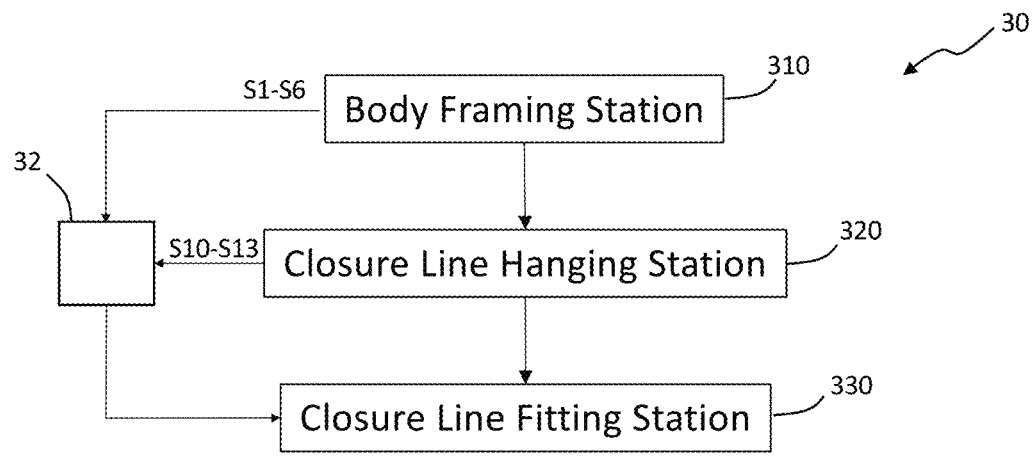
FIG. 7 shows a flow chart for a flow of sensor data along an assembly line according to the teachings of the present disclosure.

Referring now to FIG. 7, representation of the assembly line 30 with a body framing station 310, a closure line hanging station 320 and a closure line fitting station 330 is shown. As mentioned above, the body frame 100 is assembled in the body framing station 310. It should be understood that the rear door 160 can also be assembled in the body framing station 310, or in the alternative, assembled at another station, e.g., a rear door assembly station (not shown). The rear door 160 is mounted on the body frame 100 at the closure line hanging station 320. In some variations of the present disclosure, a rear door upper hinge (e.g., 152U, FIG. 2A) and a rear door lower hinge (e.g., 152L, FIG. 2A) are mounted onto the body frame 100 via the upper hinge holes 124U and the lower hinge holes 124L, respectively, and mounted to the rear door 160 via the upper hinge holes 168U and the lower hinge holes 168L. That is, the rear door 160 is mounted to the body frame 100 at the rear door panel opening 120 with a pair of hinges. In addition, CAD data for the hinges, the rear door 160 and the door panel opening 120 is used to calculate the position or positions of the outer perimeter 162 of the rear door 160 in relation to the inner perimeter 122 of the rear door panel opening 120 within manufacturing tolerances. Particularly, since the position(s) of the inner perimeter 122 is calculated and known within manufacturing tolerances in relation to the hinge holes 124U, 124L, and the position(s) of the outer perimeter 162 of the rear door 160 is calculated and known within manufacturing tolerances in relation to the hinge holes 168U, 168L, after the rear door 160 is mounted to the body frame 100, the position of the outer perimeter 162 in relation to the inner perimeter 122 is calculated and known within manufacturing tolerances.

Figure 8:
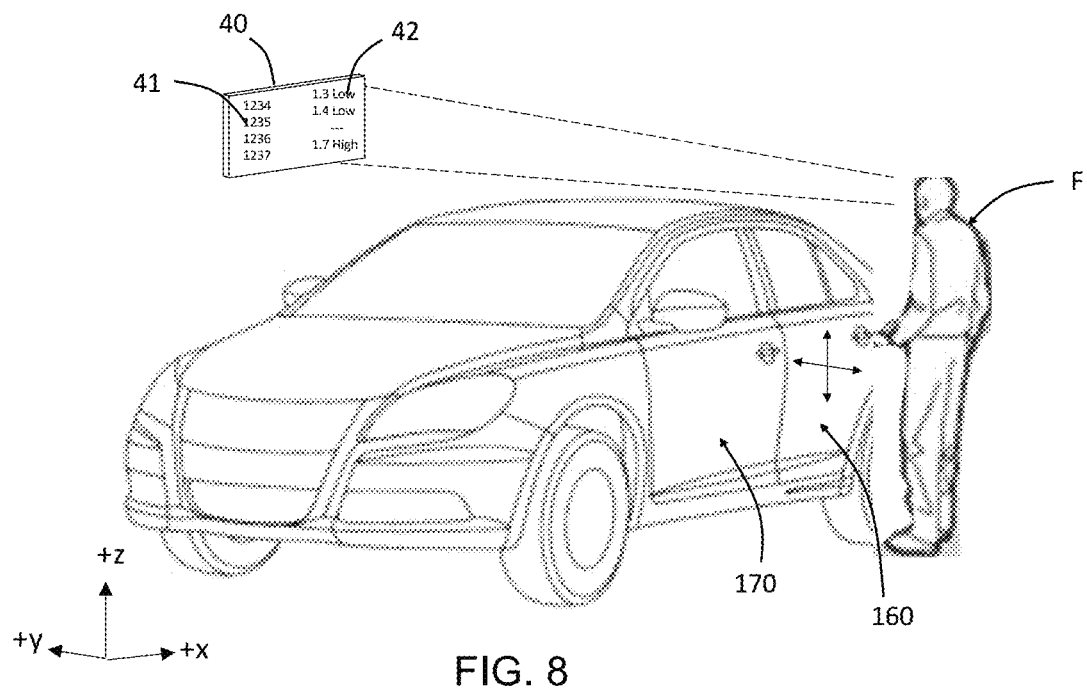
FIG. 8 shows still yet another step of a method of mounting and adjusting a vehicle panel on a vehicle according to the teachings of the present disclosure.

Still referring to FIG. 7, storage and/or transfer of the positions of the hinge holes 124U, 124L, the master locator holes 101, 103, the hinge holes 168U, 168L and the locator pins 201, 203 is shown. In some variations of the present disclosure, the positions determined by the sensors S1-6 and S10-S13 are transmitted from the body framing station 310 and/or closure line hanging station 320 to a processor 32. In some variations the processor 32 transmits the positions to the closure line fitting station 330. In one variation the processor 32 uses stored CAD data for the body frame 100, the rear door 160, and rear door hinges (not shown) in combination with the positions of the hinge holes 124U, 124L, master locator holes 101, 103, hinge holes 168U, 168L and the locator pins 201, 203, to calculate the position of the outer perimeter 162 in relation to the inner perimeter 122. Also, the processor 32 calculates the distance 'd' (FIG. 2A) between the outer perimeter 162 and the inner perimeter 122 (referred to herein as "delta") and determines if the delta is within an engineering specification for the vehicle 10. In at least one variation, the processor 32 transmits the delta to the closure line fitting station 330. The delta is then displayed to a fitter 'F' in the closure fitting station as shown in FIG. 8.

In one non-limiting example, a display 40 (FIG. 8) with a vehicle number 41 and a corresponding delta 42 are provided in the line of sight of the fitter F responsible for making any final adjustment of the rear door 160 in relation to the body frame 100. For example, the fitter F may adjust the position of one of both of the hinges by the delta shown on the display 40.

It should be understood that the fitter F is a skilled tradesperson with experience on adjusting the positions of panels in the closure line fitting station 330 on the assembly line. For example, and by viewing the display 40 shown in FIG. 8, the fitter F has the expertise to adjust the position of the rear door 160 relative to the rear door panel opening 120 down (−z direction) by 1.3 units (e.g., 1.3 millimeters) for vehicle '1234', adjust the position of the rear door 160 relative to the rear door panel opening 120 down by 1.4 units for vehicle '1235', not adjust the position of the rear door 160 relative to the rear door panel opening 120 for vehicle '1236', and adjust the position of the rear door 160 relative to the rear door panel opening 120 up (+z direction) by 1.7 units for vehicle '1237'. It should also be understood that the display 40 can display delta 42 related to adjusting the rear door 160 along a length direction (x direction) and/or a width direction (y direction) of the vehicle 10.

Figure 9:
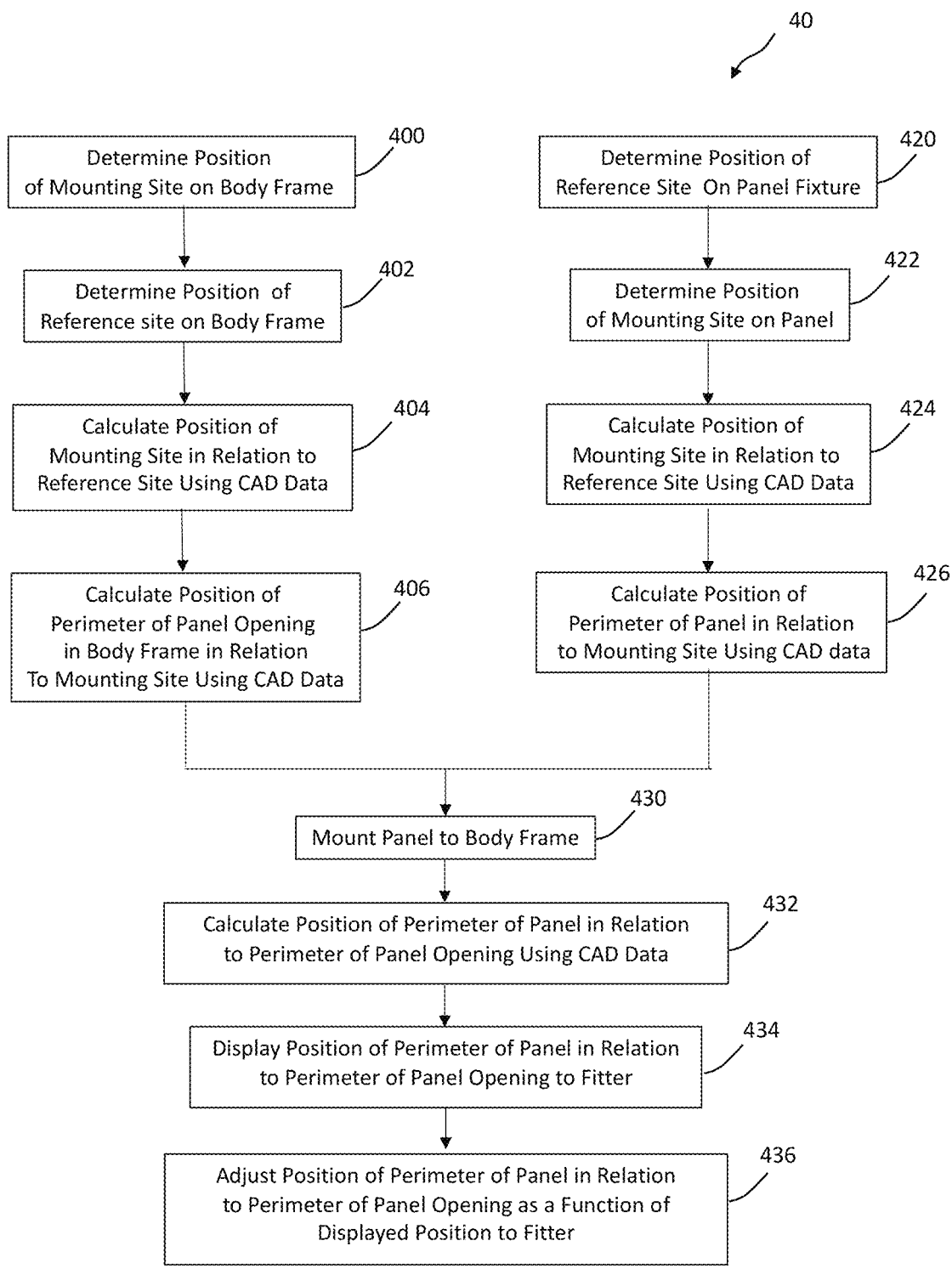
FIG. 9 shows a flow chart for a method according to the teachings of the present disclosure.

Referring now to FIG. 9, a flow chart for a method 40 for adjusting a panel on a vehicle is shown. The method 40 includes determining a position of at least one mounting site on a body frame of the vehicle at step 400 and determining a position of at least one reference site on the body frame at step 402. A position or positions of the at least one mounting site on the body frame in relation to the at least one reference site of the body frame within manufacturing tolerances is calculated using CAD data of the body frame at step 404. And a position or positions of a perimeter of a panel opening in the body frame in relation to the at least one mounting site of the body frame, within manufacturing tolerances, is calculated using the CAD data of the body frame at step 406.

The method 40 also includes determining a position of at least one reference site on a panel fixture at step 420 and determining a position of at least one mounting site on the panel after it has been mounted on the fixture at step 422. A position or positions of the at least one mounting site on the panel in relation to the at least one reference site of the panel within manufacturing tolerances is calculated using CAD data of the panel at step 424. And a position or positions of a perimeter of the panel in relation to the mounting sites of the panel within manufacturing tolerances is calculated using the CAD data of the panel at step 426.

The panel is mounted to the body frame via the mounting sites on the panel and the mounting sites on the body frame at step 430 and a position or positions of the perimeter of the panel in relation to the perimeter of the panel opening within manufacturing tolerances is calculated using CAD data at step 432. The calculated position or positions of the perimeter of the panel in relation to the perimeter of the panel opening is displayed to a fitter responsible for adjusting a position of the panel mounted on the body frame at step 434 and the fitter adjusts the position of the panel as function of the displayed calculated position or positions of the perimeter of the panel in relation to the perimeter of the panel opening at step 436.

Figure 10:
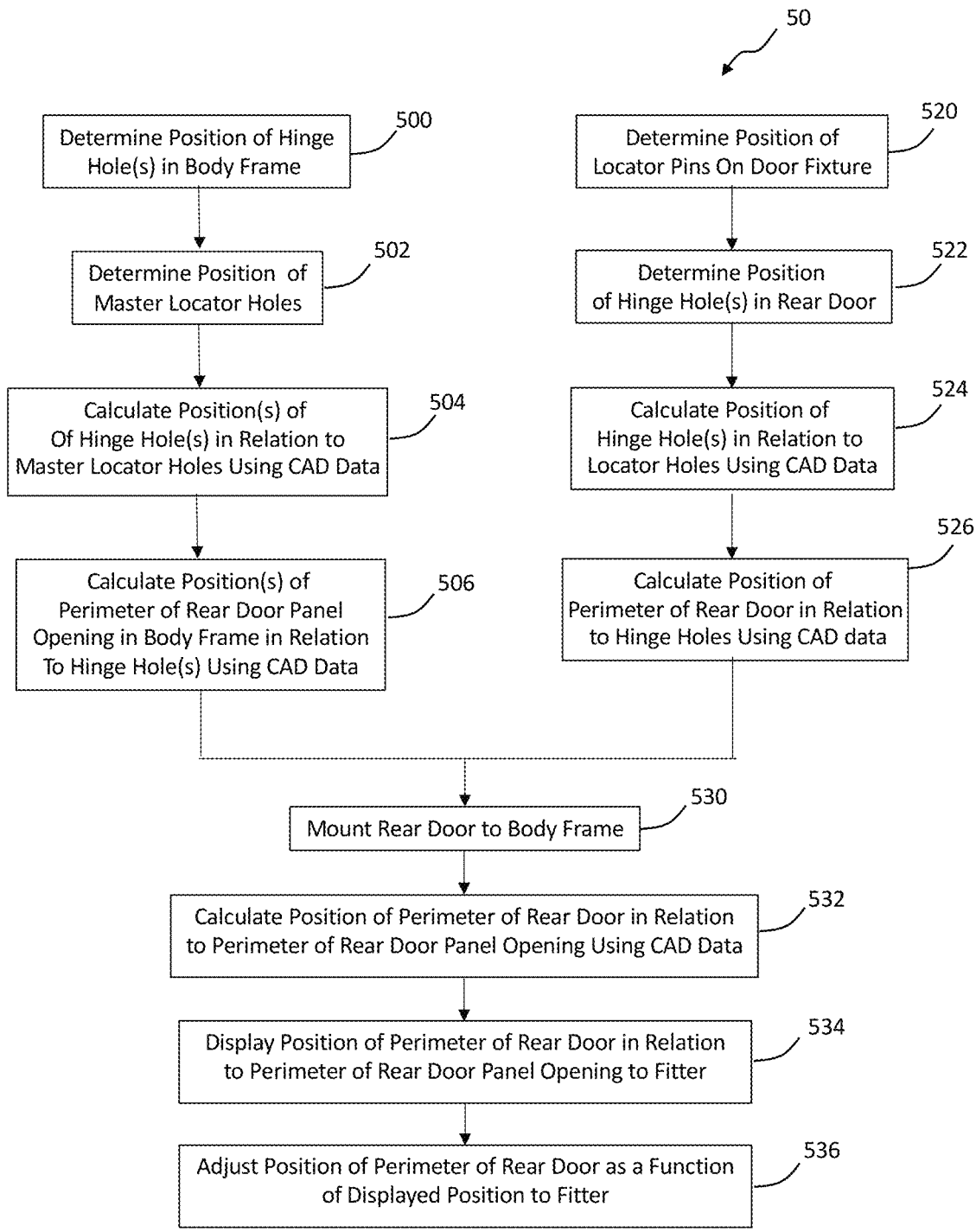
FIG. 10 shows another flow chart for a method according to the teachings of the present disclosure.

In some variations of the present disclosure, the method 40 includes adjusting a door on a vehicle. For example, and with reference to FIG. 10, a flow chart for a method 50 of adjusting a rear door on a vehicle is shown. The method 50 includes determining a position of at least one hinge hole in a body frame of the vehicle at step 500 and determining positions of a 2-way master locator hole and a 4-way master locator hole at step 502. A position or positions of the at least one hinge hole in the body frame in relation to the 2-way master locator hole and the 4-way master locator hole within manufacturing tolerances is calculated using CAD data of the body frame at step 504. And a position or positions of a perimeter of a rear door panel opening in the body frame in relation to the at least one hinge hole in the body frame within manufacturing tolerances is calculated using the CAD data of the body frame at step 506.

The method 50 also includes determining positions of a 2-way locator pin and a 4-way locator pin on a rear door fixture at step 520 and determining a position or positions of at least one hinge hole in the rear door mounted to the rear door fixture at step 522. In some variations of the present disclosure, a 2-way locator hole and a 4-way locator hole in the rear door are disposed on the 2-way locator pin and the 4-way locator pin, respectively, of the rear door fixture. In such variations, a position or positions of the at least one hinge hole on the rear door in relation to the 2-way locator hole and the 4-way locator hole in the rear door within manufacturing tolerances is calculated using CAD data of the rear door at step 524. And a position or positions of a perimeter of the rear door in relation to the at least one hinge hole of the rear door within manufacturing tolerances is calculated using the CAD data of the rear door at step 526.

In one variation of the present disclosure, the rear door is mounted to the body frame with a hinge via the at least one hinge hole in the rear door and the at least one hinge hole in the body frame at step 530, and a position or positions of the perimeter of the rear door in relation to the perimeter of the rear door panel opening within manufacturing tolerances is calculated at step 532. In another variation, a position or positions of the perimeter of the rear door in relation to the perimeter of the rear door panel opening within manufacturing tolerances is calculated before the rear door is mounted to the body frame with a hinge via the at least one hinge hole in the rear door and the at least one hinge hole in the body frame (i.e., step 532 occurs before step 530). The calculated position or positions of the perimeter of the rear door in relation to the perimeter of the rear door panel opening is displayed to a fitter responsible for adjusting a position of the rear door mounted on the body frame at step 534 and the fitter adjusts the position of the rear door as a function of the displayed calculated position or positions of the perimeter of the rear door in relation to the perimeter of the rear door panel opening at step 536.

In some variations of the present disclosure a panel mounted to a body frame is adjusted in relation to another panel that will be or has been previously mounted to the body frame. For example, and with reference to FIG. 11, a method 52 for adjusting a front door on a body frame is shown. Particularly, after step 532 in method 50, the method 52 includes calculating a position or positions of a perimeter of the front door in relation to the perimeter of a front door panel opening which includes the perimeter of the rear door. For example, a position or positions of a portion of the inner perimeter 132 of the front door panel opening 130 (FIGS. 3 and 4) within manufacturing tolerances is calculated after determining the positions of the hinge holes 134U, 134L in relation to the 2-way master locator hole 101 and the 4-way master locator hole 103, and a position or positions of another portion of the inner perimeter 132 is calculated after the position or positions of the outer perimeter 162 of the rear door 160 in relation to the inner perimeter 122 of the rear door panel opening 120 within manufacturing tolerances has been calculated. Stated differently, a portion of the outer perimeter 162 of the rear door 160 is a portion of the inner perimeter 132 of the front door panel opening 130 and the position or positions of the outer perimeter 162 is desired in order to the calculate the position or positions of the inner perimeter 132 in its entirety.

Figure 11:
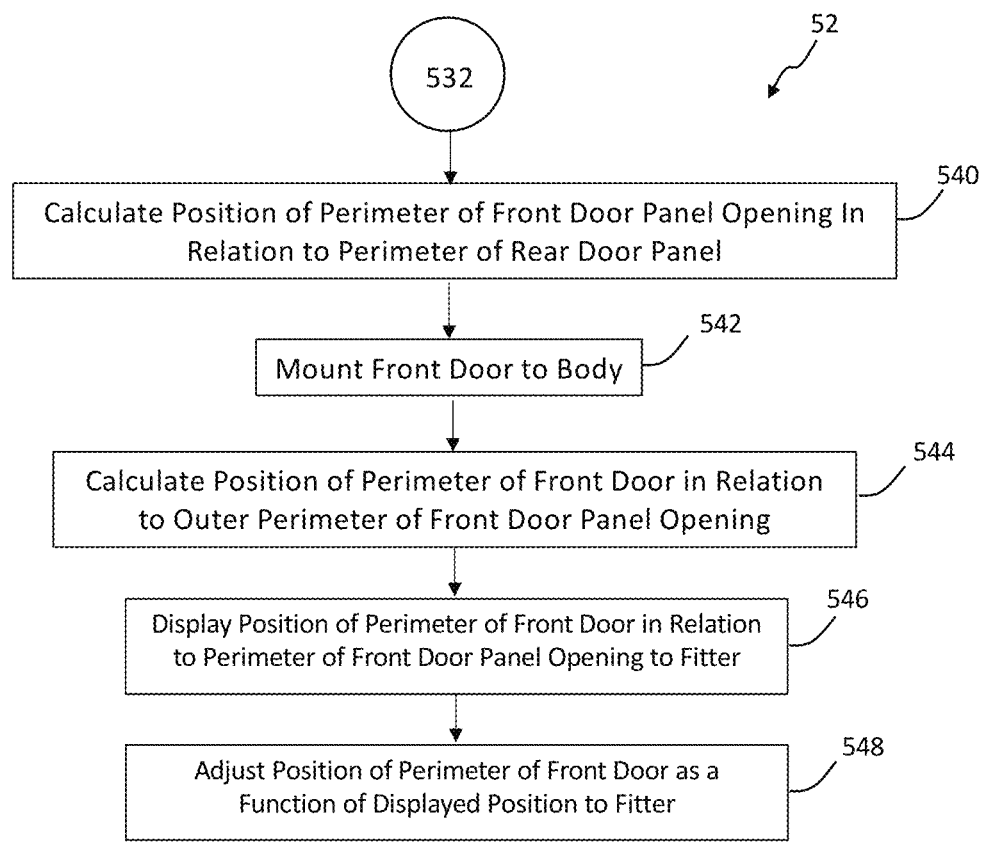
FIG. 11 shows yet another flow chart for a method according to the teachings of the present disclosure.

Still referring to FIG. 11, the position(s) of the front door panel opening 132 in relation to the perimeter of the rear door is calculated at step 540 and the front door is mounted to the body frame at step 542. In the alternative, a position or positions of the perimeter of the front door panel opening in relation to the perimeter of the rear door is calculated before the front door is mounted to the body frame (i.e., step 542 occurs before step 540). The position(s) of the perimeter of the front door in relation to the perimeter of the front door panel opening in its entirety (i.e. the inner perimeter of the front door panel opening and the perimeter of the rear door bounding the front door panel opening) within manufacturing tolerances is calculated in step 544 and the calculated position(s) of the perimeter of the front door in relation to the perimeter of the front door panel opening in its entirety is displayed to a fitter responsible for adjusting a position of the front door mounted on the body frame at step 546. The fitter adjusts the position of the front door as a function of the displayed calculated position(s) of the perimeter of the front door in relation to the perimeter of the front door panel opening at step 548.

It should be understood from the teachings of the present disclosure that a method of adjusting a panel on a vehicle is provided. The method provides real time information to a fitter in a fitting station on an assembly line that enhances the fitters adjustment of the panel. That is, real time delta measurements of the position or location of a panel in relation to a panel opening and/or an adjacent panel, within manufacturing tolerances, is displayed to the fitter, and the real time delta measurements enhance the fitters ability to adjust the panel to meet desired engineering specifications. The method can be used to enhance the adjustment of any panel or component on a vehicle with non-limiting examples including the enhancement of adjusting doors, trunk lids, hoods, sunroofs, rear quarter panels, front quarter panels, trim, and grilles, amount others, mounted on a vehicle. In some variations of the present disclosure, the real time delta measurements include differences between where a panel or a perimeter of panel is calculated to be positioned in relation to a panel opening and a calculated desired position of the panel in relation to the panel opening.

It should be understood that the term "processor" as used herein can include one or more modules and/or controllers. In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

A module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of adjusting a panel on a vehicle, the method comprising:
    determining positions of mounting sites on an assembled body frame in relation to 2-way and 4-way master locator holes;
    calculating a position of an inner perimeter of a panel opening in the body frame in relation to the body frame mounting sites;
    determining positions of mounting sites on a panel in relation to 2-way and 4-way locator pins on a fixture the vehicle panel is mounted to;
    calculating a position of an outer perimeter of the panel in relation to the panel mounting sites;
    mounting the panel to the body frame and calculating a position of the outer perimeter of the panel in relation to the inner perimeter of the panel opening;
    displaying the position of the outer perimeter of the panel in relation to the inner perimeter of the panel opening; and
    adjusting the position of the panel as a function of the displayed position.

2. The method according to claim 1 further comprising mounting devices for mounting the panel to the body frame, wherein the mounting sites on the body frame comprise hinge holes in the body frame, the mounting sites on the vehicle panel comprise hinge holes in the vehicle panel, and the mounting devices comprise hinges.

3. The method according to claim 1, wherein the calculating the position of the inner perimeter of the panel opening in the body frame in relation to the body frame mounting sites and the calculating the perimeter of the panel in relation to the panel mounting sites comprises using computer aided design data of the body frame and the panel.

4. The method according to claim 3, wherein the panel is a vehicle door.

5. The method according to claim 4, wherein the vehicle door is a rear vehicle door, the hinge holes in the body frame are rear door hinge holes in the body frame, the hinge holes in the vehicle panel are rear door hinge holes, and the hinges are rear door hinges.

6. The method according to claim 5 further comprising:
    determining positions of front door hinge holes in the body frame in relation to the 2-way and 4-way master locator holes;
    calculating a position of an inner perimeter of a front door panel opening in relation to the body frame front door hinge holes using computer aided design (CAD) data of the body frame;
    determining positions of hinge holes in a front door in relation to 2-way and 4-way locator pins on another fixture the front door is mounted to;
    calculating a panel perimeter of the front door in relation to the front door hinge holes using CAD data of the front door;
    connecting front door hinges to the front door hinge holes in the body frame and to the hinge holes in the front door such that the front door is mounted to the body frame at the front door opening panel;
    calculating positions of the front door hinges and the outer perimeter of the front door in relation to the inner perimeter of the front door panel opening using the CAD data of the body frame and the CAD data for the front door;
    displaying the positions of the outer perimeter of the front door in relation to the inner perimeter of the front door panel opening to a fitter on an assembly; and
    adjusting the position of the front door in relation to the front door perimeter as a function of the displayed positions to the fitter.

7. The method according to claim 1, wherein the function of the displayed position is a distance the mounting devices should be moved along at least one of a length direction, a height direction and a width direction of the vehicle.

8. The method according to claim 1, wherein the function of the displayed position is a difference between the calculated position of the outer perimeter of the panel with respect to the calculated inner perimeter of the panel opening and a desired position of the outer perimeter of the panel with respect to a desired inner perimeter of the panel opening.

9. The method according to claim 1 further comprising determining the positions of the mounting sites, the 2-way master locator hole and the 4-way master locator hole with at least one optical sensor.

10. The method according to claim 1 further comprising determining the positions of the mounting sites on the panel with at least one optical sensor.

11. A method of adjusting a panel on a vehicle during manufacture of the vehicle, the method comprising:
    assembling a body frame of the vehicle on an assembly line, wherein the body frame comprises a panel opening for the panel to be mounted to the vehicle;
    determining positions of hinge holes in the body frame in relation to 2-way and 4-way master locator holes and calculating a position of an inner perimeter of the panel opening in relation to the hinge holes in the body frame using CAD data of the body frame;

determining positions of hinge holes in the panel in relation to 2-way and 4-way locator pins on a fixture the panel is mounted to and calculating a position of an outer perimeter of the panel in relation to the hinge holes in the panel using CAD data of the panel;

connecting hinges to the body frame and the panel via the hinge holes in the body frame and the hinge holes in the panel;

calculating positions of the hinges and the outer perimeter of the panel in relation to the inner perimeter of the panel opening;

displaying the positions of the hinges in relation to the positions of the outer perimeter of the panel and the inner perimeter of the panel opening; and adjusting the positions of the hinges as a function of the displayed positions of the hinges.

12. The method according to claim 11, wherein the function of the displayed positions of the hinges is a distance the hinges should be moved along at least one of a length direction, a height direction and a width direction of the vehicle frame.

13. The method according to claim 11, wherein the panel is a rear door and the panel opening is a rear door panel opening.

14. The method according to claim 13, wherein the function of the displayed positions of the hinges is a difference between the calculated position of the outer perimeter of the rear door with respect to the calculated inner perimeter of the rear door panel opening and a desired position of the outer perimeter of the rear door with respect to a desired inner perimeter of the rear door panel opening.

15. The method according to claim 14 further comprising determining the locations of at least one of the body frame hinge holes, the 2-way master locator hole, the 4-way master locator hole, the 2-way locator pin, the 4-way locator pin, and the rear door hinge holes using at least one optical sensor.

16. The method according to claim 15, further comprising:
determining positions of front door hinge holes in the body frame in relation to the 2-way and 4-way master locator holes;
calculating a position of an inner perimeter of a front door panel opening in relation to the body frame front door hinge holes using CAD data of the body frame;
determining positions of hinge holes in a front door in relation to 2-way and 4-way locator pins on another fixture the front door is mounted to;
calculating a position of an outer perimeter of the front door in relation to the front door hinge holes using CAD data of the front door;
connecting front door hinges to the front door hinge holes in the body frame and to the hinge holes in the front door such that the front door is mounted to the body frame at the front door opening panel;
calculating positions of the outer perimeter of the front door in relation to the inner perimeter of the front door panel opening using the CAD data of the body frame and the CAD data of the front door;
displaying positions of the outer perimeter of the front door in relation to the inner perimeter of the front door panel opening to a fitter on the assembly line; and
adjusting the position of the front door as a function of the displayed positions.

17. The method according to claim 16, wherein the calculated position of the inner perimeter of the front door panel opening includes the position of the outer perimeter of the rear door in relation to the inner perimeter of the rear door panel opening.

18. A method for mounting and adjusting a door on a vehicle during manufacture of the vehicle, the method comprising:
determining positions of rear door hinge holes in a body frame on an assembly line in relation to a 2-way master locator hole and a 4-way master locator hole using at least one optical sensor and calculating a position of an inner perimeter of a rear door panel opening in relation to the rear door hinge holes in the body frame using CAD data of the body frame;
determining positions of hinge holes in a rear door in relation to a 2-way locator pin and a 4-way locator pin on a fixture the rear door is mounted to using at least one other optical sensor and calculating a position of an outer perimeter of the rear door in relation to the hinge holes in the rear door using CAD data of the rear door;
connecting rear door hinges to the body frame and the rear door via the rear door hinge holes in the body frame and the hinge holes in the rear door;
calculating positions of the rear door hinges and the outer perimeter of the rear door in relation to the inner perimeter of the rear door panel opening using CAD data of the rear door hinges and the CAD data for the body frame and the rear door;
displaying positions of the hinges in relation to the positions of the outer perimeter of the rear door and the inner perimeter of the rear door panel opening to a fitter on the assembly, wherein the fitter adjusts the position of at least one of the rear door hinges as a function of the displayed positions of the hinges.

19. The method according to claim 18, wherein the calculated positions of the rear door hinges, the outer perimeter of the rear door and the inner perimeter of the rear door panel opening are within manufacturing tolerances of the actual positions of the rear door hinges, the outer perimeter of the rear door and the inner perimeter of the rear door panel opening.

20. The method according to claim 19 further comprising:
determining positions of front door hinge holes in the body frame in relation to the 2-way and 4-way master locator holes;
calculating a position of an inner perimeter of a front door panel opening in relation to the front door hinge holes in the body frame using CAD data of the body frame;
determining positions of hinge holes in a front door in relation to 2-way and 4-way locator pins on another fixture the front door is mounted to;
calculating a position of an outer perimeter of the front door in relation to the front door hinge holes using CAD data of the front door;
connecting front door hinges to the body frame front door hinge holes and to the front door hinge holes such that the front door is mounted to the body frame at the front door panel opening;
calculating positions of the outer perimeter of the front door in relation to the inner perimeter of the front door panel opening using the CAD data of the body frame and the CAD data of the front door;
displaying positions of the outer perimeter of the front door in relation to the inner perimeter of the front door panel opening to a fitter on the assembly line; and
adjusting the position of the front door as a function of
the displayed positions.

\* \* \* \* \*